United States Patent [19]

Ewing

[11] Patent Number: 4,587,158

[45] Date of Patent: May 6, 1986

[54] DEFORMABLE LABEL

[76] Inventor: William D. Ewing, 475 Highland Rd., Tiverton, R.I. 02878

[21] Appl. No.: 769,371

[22] Filed: Aug. 26, 1985

Related U.S. Application Data

[63] Continuation-in-part of Ser. No. 575,187, Jan. 30, 1984, abandoned, and a continuation-in-part of Ser. No. 646,823, Sep. 4, 1984, abandoned.

[51] Int. Cl.$^4$ .................. B32B 27/06; B32B 27/32
[52] U.S. Cl. ............................ 428/219; 428/220; 428/334; 428/483; 428/494; 428/516; 428/519; 40/2 R; 206/460; 283/81; 156/230; 156/240
[58] Field of Search ............... 428/219, 220, 334, 483, 428/494, 516, 519; 156/230, 240; 40/2 R; 206/460; 283/81

[56] References Cited

U.S. PATENT DOCUMENTS

| | | | |
|---|---|---|---|
| 3,046,155 | 7/1962 | Reinke | 156/329 X |
| 3,348,995 | 10/1967 | Baker et al. | 428/215 |
| 3,380,871 | 4/1968 | Thomas | 428/497 X |
| 3,389,036 | 6/1968 | Rudolph et al. | 156/244 |
| 3,690,909 | 9/1972 | Finley | 428/40 |
| 3,702,258 | 11/1972 | Gibbons et al. | 427/40 |
| 4,317,852 | 3/1982 | Ogden | 428/40 |

OTHER PUBLICATIONS

"Modern Plastics Encyclopedia", vol. 57 (10A), p. 550 (1980-81).

*Primary Examiner*—Joseph L. Schofer
*Assistant Examiner*—Fred M. Teskin
*Attorney, Agent, or Firm*—Barlow & Barlow

[57] ABSTRACT

A label system is disclosed that is deformable and is useful for the decoration or marking of squeezable bottles or other flexible substrates. The label system is composed of a film of low or medium density polyethylene which is corona treated to accept print or decorative resin and certain curable pressure sensitive adhesives, and is affixed by the adhesive to bottles or other substrates in a manner that the label conforms to the shape of the surface of the bottle. The label deforms and recovers in essentially a permanent manner without wrinkling, cracking, tearing or being otherwise defaced due to separation or destructive fracturing of the label-substrate system.

3 Claims, 3 Drawing Figures

DEFORMABLE LABEL

RELATED APPLICATIONS

This application is a continuation-in-part of Ser. No. 575,187, Jan. 30, 1984, abandoned, and a continuation-in-part of Ser. No. 646,823, Sept. 4, 1984, now abandoned.

BACKGROUND OF THE INVENTION

This invention relates to a label coated with a pressure sensitive adhesive that will decorate and conform to the surface of polyethylene, polyethylene terephthalate, polyvinyl chloride, polypropylene and other flexible plastic containers, and having advantages of being deformable, non-shrinking, and improved adhesion in a manner that is essentially a permanent part of the system, similar in appearance and mechanical performance to the surface of the substrate itself.

The packaging industry has increasingly evolved to the use of flexible materials in place of rigid glass and metal in containers for both solid and liquids. Where items of oil and water based fluid categories, as for example, milk, beer, catsup, mustard, sugar syrups, soaps, cooking oil or motor oil, to name a few, were packaged in glass or metal containers, they are now more often packaged in plastic containers. Certain of these containers being polyethylene, polypropylene, polyvinyl chloride, polyethylene terephthalate, and the like are flexible by their nature and are intended to be deformable in that the container may change its shape during the course of its manufacture, processing, or use cycle, and upon removal of the deforming force, return to its original shape or dimension. This, of course, has advantages of design, manufacture and display as well as in protection and dispensing of the products. It also has certain disadvantages, one of these being that conventional labels of paper do not expand and contract uniformly with the bottle substrate during hot filling operations, and do not flex or deform during mechanical handling and end-use without wrinkling, creasing, tearing or otherwise suffering permanent damage to the label.

Previously, labels for deformable and flexible bottles, packages or parts has been approached generally in three ways; (1) by printing directly on the substrate, (2) by using flexible polyvinyl chloride labels, and (3) by heat transfer printing and decorating. Each of these methods, in addition to being more expensive than conventional paper labels, has other drawback as well.

Direct printing, as for example that system disclosed in the U.S. Pat. No. 3,249,044, has obvious limitations of design and ability to be incorporated into a high volume production line manufacturing method. Using vinyl (PVC) films in deformable labels is well known and is practiced effectively in a variety of application. Vinyl, however, has chemical and physical characteristics which are limiting in several notable respects. Polyvinyl chloride in unmodified form, is rigid and must be highly plasticized and stabilized to be sufficiently flexible and stable for use in application such as deformable label film. The physical and chemical characteristics of these highly modified vinyl films result in limitations of film thickness, dimensional stability during hot-filling or other thermal operations, compatibility (migration of plasticizers and stabilizers) with adhesives and substrates and in shelf life. Heat transfer printing and decoration, as for example that disclosed in British Pat. No. 1,487,749, while faster than direct printing is still slow relative to current general purpose labeling lines.

Polyethylene films have not previously been used as deformable labels.

Prior to this time it was generally accepted that the polyethylene homopolymer films were not suitable to the printing, handling and adhesion requirements of this demanding application. I have now discovered that a label system comprised of certain polyethylene film materials, together with selected adhesive as provided in the later sections of this specification, and combined in the manner of this invention, does indeed provide a label that is suitable for use in the deformable label application and that is unique in its ability to function essentially as an integral part of the package itself, allowing bottles, packages, parts and the like, not only to be pre-labeled prior to hot-filling or other thermal or mechanically abusive operations, but also to provide the same resistance to thermal, and/or mechanical deformations, as well as chemical resistance throughout an extended use and shelf-life period.

SUMMARY OF THE INVENTION

A label is disclosed which is unique in the ability to adhere to flexible and deformable surfaces throughout cycles of severe mechanical stress, temperature change or atmospheric exposure without shrinking, wrinkling, loosening, scratching or otherwise defacing. The label is comprised of certain low to medium density polyethylene films, which are 0.5 to 5 mil in thickness and which are corona treated or otherwise modified to render the surface more suitable for printing and for essentially permanent bonding with certain adhesives which are suitable to the invention and which are generally described as pressure sensitive, and are further characterized by their ability to cure to permanent set while maintaining an elastic nature. The label may be printed or decorated in a manner conventional to the art, and when affixed to a substrate and cured in the manner described, does remain essentially a permanent part of the substrate system, providing essentially the same mechanical and chemical characteristics as the substrate itself, resistant to creasing, wrinkling, cracking, tearing, shrinking, tearing or creeping in a manner to great advantage over paper, vinyl and other lables of the prior art.

DETAILED DESCRIPTION OF THE PREFERRED EMBODIMENT

Figure 1:
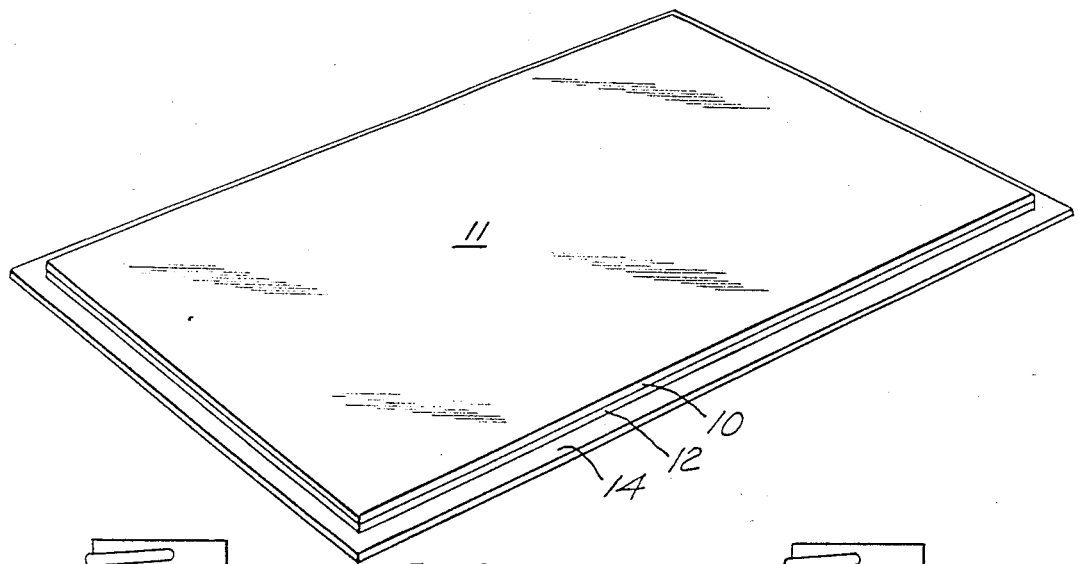
FIG. 1 is a perspective view greatly enlarged of the label made in accordance with the invention.
Figure 2:
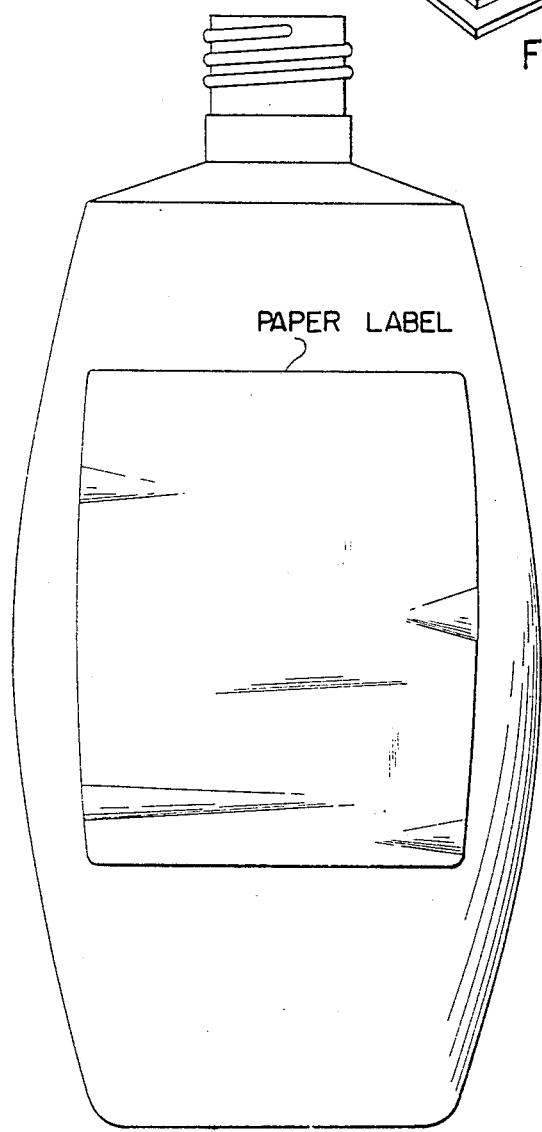
FIGS. 2 and 3 are elevational views respectively of a prior art label and the label of the invention applied to a container.
Figure 3:
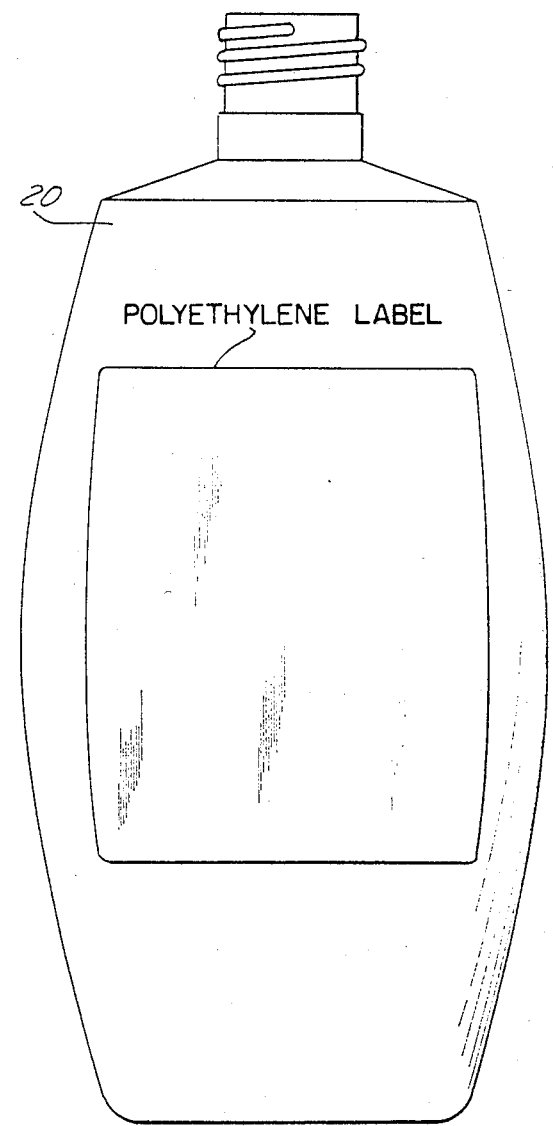

In the drawings there is shown a label material consisting of a polyethylene film 10 with a thickness between 0.5 and 5 mils (0.0127–0.27 mm) and which has an upper surface 11 with printing thereon. It should be understood that the printing may be on either side. The polyethylene, which is low to medium density, should have a Rockwell hardness on the D scale between 40 and 60 and a tensile strength between 1000 and 3500 psi (70 and 246 kg/sq.cm), while the specific gravity should range between 0.91 and 0.94. The surfaces of the polyethylene film should be corona treated to enhance the ability of the film to receive adhesive and printing. In processing, it is preferred that indirect coating type process be used wherein the backing paper or sheet 14 be coated with a pressure sensitive adhesive in the general process as disclosed in the Sackoff et al patent U.S. Pat. No. 4,151,319 dated Apr. 24, 1979. Essentially the kraft paper or other supportive sheet is coated with a suitable release material, such as, a silicone, or one of the other conventional materials used for this purpose. Thereafter, the coated sheet is passed through a curing oven which utilizes a conventional curing means, such as, heat, etc., to appropriately cure or set the release material. This produces a release surface on the release sheet. The release sheet is then coated with a modified pressure sensitive adhesive using a knife-coater, for example. Other methods in addition to knife-coating include, for example, spraying, roller coating, gravure foll coating, and the like. After application of the pressure sensitive adhesive, the coated release sheet is cured. Typically the pressure sensitive adhesive layer has a thickness in the range from about 0.1 to 2 mils. Generally, it is coated in an amount based on the dry solids weight, of from about 0.5 to 3.0 mg/sq.cm. Thereafter the thus coated and cured sheet is married to an appropriate decorative or protective facing layer unrolled from a roll. The two layers may be married by passing through nip rolls in a manner well known in the art.

Alternately, in processing the polyethylene is coated directly with a pressure sensitive adhesive, that is an adhesive that remains tacky in its normal form. The pressure sensitive adhesive 12 in the preferred form may be selected from a well-known class of acrylic adhesive materials generally available in the art. Example of polymer types used generally in the adhesive application areas and commonly employed in formulating pressure sensitive compounds are elastomers such as natural rubber or synthetic rubbers containing polymers or copolymers of styrene, butadiene, acrylonitrile, isoprene and isobutylene, thermoplastic polymers or copolymers of vinyl acetate, vinyl ethers, vinyl chloride, ethylene, propylene, acrylamide and thereoset and specialty polymeric materials such as polyamide, polyurethane, polyester, silicones and the like. Such compounds and their formulations are known to the art and the range and versatility of structures and properties is discussed, for example, by Martin, *Pressure Sensitive Adhesives; Formulations and Technology*, Noyes Data Corp., 1974 and by Wake, *Adhesion and the Formulation of Adhesives*, Applied Science Publishers Ltd., London, 1976. Typically, such conventional adhesives are multiple component systems, comprised of tack components, tack modifiers, solvent and the like. Since the range and multiplicity of components in these adhesive formulations is broad and diverse, it is not practical to stipulate herein those formulations that are or are not suitable to the invention, but rather to define and stipulate the requirements of performance desirable and necessary to the intent and performance of the invention.

Subsequent to the application of the pressure sensitive adhesive layer 12, either the polyethylene label or the backing sheet, depending on which process is used, may be subjected as necessary to a drying or curing step, such as by heating. If a backing sheet is used the polyethylene film 10 and the backing paper 14 will be married together. The film may be suitably die cut as suggested by U.S. Pat. Nos. 3,501,365 and 4,060,168 so that a plurality of labels will lie in spaced relationship on the backing sheet 14.

Thus it is found in a preferred form of the invention that certain acrylic based adhesives have favorable properties of clarity, adhesion and cohesive strength, give the performance neccesary to joining the film and substrate surfaces in a manner that there is intimate and essentially permanent contact and a result of sufficiently identical deformation and recovery movement to make the label essentially an extension of the substrate surface. The properties of the adhesive are critical to successful functioning of the label system. The adhesive must form bonds with both the polyethylene film and with the surface of the substrate that are greater than the elastic forces of the film. Further, and most importantly, the adhesive must have high cohesive strength, but also be capable of elastic behavior; able to deform with both the film and substrate, but able to maintain the integrity of the system, without rupture during mechanical stress.

Adhesives suitable to the invention are commonly available within the art. Broadly these are adhesives having the ability to cure to a high level of adhesion and cohesive strength. Such adhesives in a preferred form are copolymers of acrylic acid esters, as for example 2-ethylhexyl acrylate, with polar co-monomers such as acrylic acid. Such adhesives are well known and common to the art, and are disclosed in *Handbook of Adhesives;* 2nd Edition, 1977, p 728. These adhesives have the advantages of clarity, aging stability, moisture resistance and solvent resistance. Basic properties of adhesion, as measured by peel strength, static shear and the like are controlled by the composition of the ester; that is the alcohol used and co-monomers used, as well as by degree of polymerization, degree of unsaturation and the like. Actual adhesion values in practice are influenced by the amount of adhesive used, residual solvents or oils, and the nature of the film and the substrate surface.

While performance of the adhesive is basic to the utility of this invention, composition or chemical identification of that adhesive is not considered germain to the invention except as they generally affect the gross result of adhesion, elastic or flex behavior, clarity, shelf life and the like. Products of that nature and compositions suitable to the application are several and diverse and may be arrived at in a variety of methods and formulations by one skilled in the art.

Thus, the objective of this invention is to define the practical requirements of adhesive systems suitable to the application. Although it is further an object of the invention to define one or more examples of adhesives suitable to the utility of the invention, it should be understood that other examples, of diverse formula and composition, can function as well, and that the invention is not limited to or by the example of adhesive used herein.

As demonstrated by the examples of Table II and Table III, the bonding properties of acrylic based adhesives useful to the invention vary markedly with the nature of the film and of the substrate to which it is bonded. Both 2 mil (0.05 mm) medium density polyethylene (MDPE) and 3 mil (0.07 mm) low density polyethylene (LPDE) films, corona treated and coated with 0.5 to 1.0 mil (0.0127 to 0.025 mm) of a commercial acrylic base adhesive, show essentially identical peel strength values on corresponding test substrates, indicating that the bond to the treated film surface and the cohesive strength of the adhesive is stronger than the bonds with any of the substrates, and that the thickness of the polyethylene film has no effect on the peel strength values. Although the peel strength values change significantly with the nature of the substrate, with the bond to PVC (rigid) being almost two times the values observed in the tests using glass and steel surfaces, these differences become much smaller with time as the acrylic adhesive continues to cure and the values of tests on glass and steel approach the peel strength of the film bonded to the PVC surface which appears to reach nearly optimum values within 24 hours. It is assumed that the larger peel strength value for PVC substrates is due to chemical interaction of the adhesive system with the PVC.

Comparison within the experimental set for the 4-mil (0.10 mm) PVC film, coated with the same adhesive as the polyethylene film, indicated that there is a decided disadvantage of such a deformable label system using the highly plasticized PVC film. In this case, peel adhesion values using the rigid PVC surface are more than two times higher than adhesion values of tests using steel and glass surfaces. While the values for vinyl film bonded to steel and glass are slightly more (20%) than corresponding values for the polyethylene films after 24 hours, those differences increase after seven-days' aging, indicating an increasing influence of plasticizer migration from the film to the adhesive. Even greater indication of that plasticizer migration is the very large 24-hour peel adhesion value for the vinyl film to vinyl surface examples, along with the complete failure of that system in the seven-day test where the adhesive remains with the substrate test surface in both samples tested. Similar failure, although less complete, was demonstrated in both seven-day test samples of PVC film bonded to steel.

Such migration of plasticizer and other additives from flexible PVC films is well documented and recognized as a major problem area in this type of product, manifesting itself as loss in adhesion, color buildup, shrinkage, loss in flexibility and ultimately in wrinkling, cracking and visual deterioration of the label system. All of these problems common to vinyl are demonstrated in the data of Table 1, wherein accelerated aging tests for experimental systems II, III, IV and V of this invention are shown in comparison with commercial flexible vinyl label materials. The LDPE and MDPE samples are quite stable under the conditions of the test, whereas the vinyl samples show the rapid deterioration common to, and expected of highly plasticized vinyl films.

Previously, it was considered by those skilled in the art, that polyethylene homopolymer films were unsuitable for pressure sensitive labels in flexible applications such as bottles for health care or food products. Indeed products such as that of Example I, below, using a 4 mil (0.10 mm) film of HDPE may be made into a pressure sensitive label and successfully applied to flexible substrates, but these are not deformable in the sense of this invention; as it is shown in Example I, these separate from the adhered surface upon flexing of the system as in squeezing of a bottle.

However, it is an object of this invention to show that stable and useful flexible label systems can be made using polyethylene film, if certain gross requirements of film dimension and physical property combinations are maintained along with coincidental requirements of film surface treatment and adhesive performance. Thus, while the preferred form of this invention includes the use of low and medium density polyethylene, and film thicknesses of 0.5 to 5 mils (0.0127 to 0.127 mm), it is essential to point out that the density of the polyethylene must be matched with the thickness of the film in order to conform with the invention and to provide the utility defined herein.

More specifically, it is the objective of this invention to describe a flexible and deformable label system wherein the polyethylene film is limited to a definite set of products that are defined by a combination of the density of the polyethylene used and the thickness of the film itself. While the density of polyethylene useful in the application broadly includes the low and medium density grades of polyethylene commercially available, and proceeds from about 0.91 g/cc (25° C.) to about 9.94 g/cc (25° C.) in density, and the thickness of films useful in the application proceeds from about 0.5 mil (0.0127 mm) to about 5 mil (0.127 mm) in average cross section, not all combinations of density and thickness therein are useful to the application or valid to this invention.

Thus, a film of LDPE with density as low as 0.91 g/cc, being soft and with low tensile strength between 1000 and 2500 psi (70 and 175 kg/sq.cm), may not be useful in the invention at less than about 2 mil (0.05 mm) thickness, but can be used above 2 mil (0.05 mm) to about 5 mils (0.127 mm) film thickness. Also, a film made of medium density polyethylene (MDPE) of up to 0.94 density, being more rigid and having a high tensile strength between 2500 and 3500 psi (175 and 246 kg/sq.cm) may not be useful in the deformable label application at thicknesses greater than about 3 mil (0.076 mm) but can be used downward to the thickness of about 0.5 mil (0.0127 mm) in the application.

It may be implied from the discussion above that when film density and thickness are considered throughout the range of utility there is an area of overlap which would comprise the area of greatest utility. That area, being the range of 2 to 3 mil (0.05 to 0.076 mm) in the film thickness and 0.915 g/cc to 0.935 g/cc in density of the polyethylene, represents the preferred form of this invention.

The examples below are given to illustrate the utility and scope of the invention.

EXAMPLE I

A pressure sensitive label system (I) was constructed of a 4 mil (0.1 mm) film of white HDPE, corona treated on both sides to enhance acceptability of ink and adhesive resins. The film was coated in the manner of the art with 0.5 to 1.0 mil (0.0127 to 0.025 mm) of an acrylic based adhesive in conjection with a fifty-pound kraft paper release linear or backing paper 14, the adhesive being a self-crosslinking pressure sensitive solvent system, (National Adhesives Duro-Tak 80-1054, or an equivalent), with peel strength of about 50 oz. (1417 grams) (Pressure Sensitive Tape Council Test Method I) and high cohesive strength; with a hold of minimum 24 hours at 2 psi (16 g/sq.cm) loading by Test Method PSTC-7. In printing and label dispensing tests, System I accepted solvent based printing well and was applied to flexible containers with conventional automatic labeling equipment. Squeeze testing of the labeled bottles confirmed that System (I) does not meet deformable requirements of application due to wrinkling and lifting when the substrate and label system is flexed.

EXAMPLE II

A pressure sensitive label system (II), was constructed as in the previous example, but using a 3 mil (0.076 mm) film of white LDPE. Testing of the label system for printing and label dispensing showed good acceptance of ink and successful labeling of cylindrical 16 oz. (0.47 l) HDPE bottles to a rate of 300 per minute on automatic equipment and 90 labels per minute on semi-automatic equipment. The labeled bottles showed excellent resistance to wrinkling, creasing, or other damage due to deformation of the label and substrate.

EXAMPLE III

A pressure sensitive label system (III), was constructed as in Example I, but using 2 mil (0.05 mm) thick film of clear MDPE. Printability, label dispensing and flex tests gave results similar to Example II.

EXAMPLE IV

A pressure sensitive label system (IV), was constructed as in Example I, but using 2 mil (0.05 mm) thick film of white MDPE. Printing and flex tests gave results similar to II and III.

EXAMPLE V

A pressure sensitive label system (V), was constructed as in Example I, but using a 3 mil (0.076 mm) film of silver metallized LDPE. Printing and flex tests gave results similar to II, III and IV.

EXAMPLE VI

A pressure sensitive label system, as in Example II was constructed of the same 3 mil (0.0766 mm), low density polyethylene film and National 80-1054 adhesive components, but differs in that no backing paper or release liner was used, and the adhesive was applied directly to the one side of the film with a roller system to a thickness of about 0.5 mil (0.0127 mm) using a roller bar system. Within 2 minutes time of coating with adhesive, and without additional heating or forced air drying, the labels were applied directly to 16 l oz. (0.47 l) LDPE and PVC bottles. After storage for 24 hours the bottles were tested by squeeze and flex tests. Results were similar to Examples II, III, IV and V in that the labels do not lift, wrinkle, crease or otherwise suffer permanent damage even in severe squeezing and flexing conditions.

EXAMPLE VII

In a separate experiment to compare the utility of emulsion solution types of pressure sensitive adhesives in the application, a 3 mil (0.0766 mm) film of white LDPE, corona treated on one side, was cut to 1 in.×6 in. strips and coated with 0.5 to 1 mil (0.0127 to 0.025 mm) of the adhesive as indicated in the table below. Samples were dried for the given time and applied to the surface of a 16 oz. cylindrical HDPE bottle. The samples were tested instantly and at 24 hours intervals to compare adhesion and the ability to resist wrinkling and separation as the bottles are squeezed and deformed. Results are qualitative and relative to National 80-1054 as control. Adhesion was measured qualitatively be hand. Deformation was measured by depressing the surface of the containers with thumb pressure to cause a V-shape crease in the container and label. A good rating indicates no separation as the apex of the V passes through the label.

| Sample | Dry Time | Adhesion/Deformation | | | |
|---|---|---|---|---|---|
| | | Instant | 24 hour | 8 hour | 96 hour |
| Emulsion No. (1) | 0.5 min. | low/poor | low/poor | low/good | med/good |
| Emulsion No. (1) | 2.0 min. | med/fair | med/good | med/good | high/good |
| Control No. (2) | 0.5 min. | high/fair | v.h./good | v.h./exc., | |
| Solvent No. (3) | 0.5 min. | high/fair | v.h./good | v.h./exc. | |

(1) Morton Chemical ADCOTE 73A207A, 60% solids emulsion, acrylic base.
(2) National Adhesives 80-1054 solution type, acrylic base.
(3) Monsanto Gelva RA-2491 solution type, multipolymer adhesive.

EXAMPLE VIII

A clear film of 3 mil LDPE, corona treated and printed on the one side with both a white vinyl based ink and a black polyamide ink, was coated on the same side with the printing with 0.5 mil (0.0127 mm) of National 80-1045 adhesive, dried with hot air and applied to the surface of a clear 4 oz. (0.23 l) LDPE Boston-Round bottle. The label so constructed was to have excellent initial tack and adhesion, but could be removed and repositioned on the bottle without damage to the label. After curing for a period of 18 hours the adhesion increased such that the label could not be removed from the surface of the bottle without permanent damage to the label. The label did not wrinkle, separate or become otherwise damaged when the bottle was squeezed, deformed by twisting, or when the outer surface of the label was wiped with methyl ethyl ketone (MEK), or iso-propyl alcohol solvents.

Application Testing (1) Label Dispensing Tests.

Label dispensing tests were conducted on systems from Examples II and III on both semi-automatic and high speed automatic labeling lines. Although the softer LDPE required machine adjustments for peeling of the release linear and indexing problems occur due to distortion in thermal curing of inks in the printing cycle, both Examples II and III were run at rates of 300 labels per minute.

(2) Printability Tests.

Test label Examples I, II, III, IV and V were tested for printability using solvent based inks. Example V required refreshing with corona discharge, but all gave essentially same result of good ink adhesion.

(3) Squeeze Testing.

Squeeze testing of Examples I, II, III and V compared with a commercial 4 mil (0.10 mm) "squeezable" vinyl label material was conducted using a machine constructed to simulate hand squeezing of bottles. Health care and food product bottles were squeezed with 20 and 50 psi (1.4 and 3.5 kg/sq.cm). The HDPE label (I) lifted, bubbled and creased. The vinyl label developed some bubbles, but labels II and III were not damaged.

(4) Shower-Squeeze Testing.

Shower-squeeze testing was conducted on Examples II and III as bottles labeled in commercial dispensing tests were placed in active shower stalls and flexed 3 to 4 times daily for 210 days (7 months). These labels suffered no damage of tearing, lifting, bubbling or wrinkling in that time.

(5) Bean Bag Testing.

Bean bag testing of Examples II and IV consisted of affixing printed labels to commercial one-pound bags of pea beans and rice. Bags were made of clear, highly flexible PE. After three months of intermittant handling and squeezing with intent to wrinkle, crease and lift the test lables, said labels were intact, undamaged and appeared to be a permanent part of the package which was itself severely wrinkled and damaged by the test handling experience.

(6) Accerlerated Aging Tests.

Accelerated aging tests of Systems II, III, IV and V in comparison with commercial flexible vinyl label materials was conducted with unprinted samples on glass plates and on HDPE bottle substrates under controlled conditions of heat and air flow. In Table I, 1"×2" samples of label systems without printing or topcoating were affixed to clear glass plates and placed in a forced draft oven and held at 100° C. with air flow equivalent of two volume changes/hr. In Table 2 samples were affixed to cylindrical 8 oz. (0.27 ml) HDPE bottles and aged at 90° C. under similar air flow conditions. Results of the tests show that the PE label systems have excellent thermal and oxidahive stability. The vinyl systems show severe aging characteristics, color change, migration and evaporation of plasticizers, shrinkage, stiffening and poor adhesion.

(TLMI No. IX LD-7-81) using 1"×6" samples cured for 24 hours and 7 days at 72° F. Results of these tests in Tables 2 and 3, show II and III to reach essentially cured and stable states at 24 hours, showing slightly higher values after 7 days; but with no apparent change in cohesive and adhesive forces. Vinyl samples show more significant changes with time, evidently relating to interaction of plasticizer and adhesive that results in large increases in adhesion to substrate and weakening of cohesive forces causing adhesive to stay with substrate.

TABLE 3

| Sample Substrate | | 24 Hr. Peel Adhesion[2], (oz./in.) | | |
|---|---|---|---|---|
| | | Vinyl[1] (4 mil) | II (3 mil LD) | III (2 mil MD) |
| PVC | a | 123 | 67.2 | 70.4 |
| | b | 123 | 70.4 | 58.8 |
| Plexiglas | a | 49.6 | 44.8 | 44.8 |
| | b | 52.8 | 44.8 | 43.2 |
| Glass | a | 52.8 | 41.6 | 43.2 |
| | b | 52.8 | 44.8 | 43.2 |
| Steel | a | 40. | 32. | 35.2 |
| | b | 38.4 | 35.2 | 35.2 |

[1]Commercial "squeezable" vinyl, white 4 mil
[2]TLMI Test No. IX LD 7-81

TABLE I

| | Initial appearance/ adhesion[3] | Accelerated Aging[1]/Glass Substrate | | | |
|---|---|---|---|---|---|
| | | Time | | | |
| | | 1 hr. appearance/ adhesion | 8 hr. appearance/ adhesion | 24 hr. appearance/ adhesion | 56 hr. appearance/ adhesion |
| Sample | | | | | |
| Vinyl A[2] | White/Exc. | White/Exc. | Sl. Yellow Good | V. Yellow | Tan/Poor[5] (Stiff) |
| Vinyl B[2] | White/Exc. | White/Exc. | Sl. Yellow/ Good[4] | Sl. Yellow Good | Tan/Poor[5] (Stiff) |
| II | White/Good | No Change | No Change | No Change | No Change |
| III | White/Good | No Change | No Change | No Change | No Change |
| IV | Clear/Good | No Change | No Change | No Change | No Change |
| V | Silver/Gd. | No Change | No Change | No Change | No Change |

[1]Samples 1" × 2" affixed to glass plate, cured 24 hours at 20° C./50% humidity and aged at 110° C. in forced draft oven.
[2]Commercial samples of flexible (Squeezable) vinyl labels, 4 mils (0.10 mm) thickness.
[3]Qualitive observations.
[4]Adhesive failure; part stays with substrate surface.
[5]Significant hardness change, film stiff.

TABLE 2

| | Initial Color/ adhesion[3] | Accelerated Aging[1] on Bottles | | | |
|---|---|---|---|---|---|
| | | Time | | | |
| Test | | 1 hr. Color/ adhesion | 8 hr. Color/ adhesion | 24 hr. Color/ adhesion | 56 hr. Color/ adhesion |
| Sample | | | | | |
| Vinyl A[2] | White/Exc. | No Change | White/ Reduced | V. Sl. Yellow Wrinkled[4] | Sl. Yellow/ Wrinkled[4] |
| Vinyl B[2] | White/Exc. | No Change | White/ Reduced | Sl. Yellow/ Wrinkled[4] | Lt. Tan/ Hard[5] |
| II | White/Good | No Change | No Change | No Change | No Change |
| III | White/Good | No Change | No Change | No Change | No Change |
| IV | Clear/Good | No Change | No Change | No Change | No Change |
| V | Silver/Good | No Change | No Change | No Change | No Change |

[1]Samples 1" × 2" affixed to 8 oz. (2 in. diameter) HDPE bottles, aged at 90° C. in forced draft oven.
[2]Commercial sample of flexible (squeezable) vinyl labels, 4 mil (0.10 mm) thickness.
[3]Qualitative observations.
[4]Label wrinkles when bottle is flexed.
[5]Significant flex loss.

(7) Adhesion Testing by Peel Strength.

Adhesion testing by peel strength was conducted on Examples II and III and compared with a commercial vinyl label material by standard peel adhesion test

TABLE 4

| Sample Substrate | | 7-Day Peel Adhesion[2], (oz./in.) | | |
|---|---|---|---|---|
| | | Vinyl[1] (4 mil) | PE-II (3 mil LD) | PE-III (2 mil MD) |
| PVC | a | 97.6 | 68.8 | 65.6 |
| | b | 96. | 67.2 | 70.4 |
| Plexiglas | a | 67.2 | 54.4 | 51.2 |
| | b | 65.6 | 56. | 52.8 |
| Glass | a | 67.2 | 55. | 52.8 |
| | b | 67.2 | 54.4 | 52.8 |
| Steel | a | 78.4 | 65.6 | 56. |
| | b | 75.2 | 62.4 | 54.4 |

[1]Commercial "squeezable" vinyl, white, 4 mil
[2]TLMI Test No. IX LD 7-81

(8) Static Shear Tests.

Static shear tests were conducted with Examples II and III in comparison with a commercial 4 mil flexible vinyl label system. Tests were conducted according to TLMI test No. VII LD-7-81 where 1"×6" samples are pulled at an angle of 2° from parallel with the adhering surface and the time required to pull the pressure sensitive material from the surface is recorded. The data recorded in Table 5 using a ten pound (4.5 kg) weight for the pull shows that the PE label systems, both LD and MD, are basically different from the vinyl system in that the film itself is essentially the weakest part of the system; that is the strength of the LD and MDPE film itself is less than the cohesive or the adhesive strength of the acrylic adhesive system.

TABLE 5

| Test Weight | Test Substrate | | Static Shear Tests[1] | | |
|---|---|---|---|---|---|
| | | | Vinyl[2] | II[3] | III[4] |
| | | | seconds to release | | |
| 3 | PVC | a | 300 sec. | 94 sec.[5] | 138 sec.[6] |
| | | b | 273 | 201 | 165 |
| 3 | Plexiglas | a | 142 | 5 | 4 |
| | | b | 94 | 6 | 3 |
| 3 | Glass | a | 68 | 10 | 5 |
| | | b | 62 | 9 | 4 |
| 3 | Steel | a | 122 | 6 | 3 |
| | | b | 101 | 6 | 4 |
| 10 | PVC | a | 1.2[7] | 3[7] | 2[7] |
| | | b | 3.5 | 3[7] | 2[7] |
| 10 | Plexiglas | a | 0.2 | — | — |
| | | b | 0.2 | — | — |
| 10 | Glass | a | 1.0 | — | — |
| | | b | 0.5 | — | — |
| 10 | Steel | a | 5.3 | — | — |
| | | b | 6.2 | — | — |

[1]TLMI Test No. VII LD 7081
[2]Commercial sample of 4 mil, white squeezable vinyl
[3]3 mil white LDPE
[4]2 mil white MDPE
[5]Stretched 30% before releasing
[6]Stretched 50% before releasing
[7]Film broke

I claim:

1. A flexible and deformable label on a deformable container substrate comprising a printable polyethylene film layer, together with an adhesive layer affixed to said deformable substrate, the polyethylene layer derived from low density polyethylene having a specific gravity of from 0.910 to 0.925 g/cc and a tensile strength between 70 kg/sq.cm and 175 kg/sq.cm, and having a thickness between 0.0127 mm and 0.127 mm, wherein the polyethylene film is corona treated to enhace bonding with adhesive, and having printing on a side thereof and a layer of adhesive on a side thereof, said adhesive being selected from the group of materials generally characterized as pressure sensitive and being further characterized by the ability to form a bond with said film and the substrate such that the strength of the film-adhesive interface and the substrate-adhesive interface and the cohesive strength of the adhesive itself are both greater than the forces required for deformation and recovery of the film itself, such forces being greater than a minimum of 140 g/sq.cm, and wherein the substrate is selected from the group consisting of polyethylene (high and low density), polyvinyl chloride, polypropylene, polyester, polystyrene, natural rubber, and SBR rubber, said flexible label having improved and surprising characteristics of adhesion to the substrate with resistance to damage from cracking, tearing, creasing, wrinkling or shrinking due to physical abuse and flexing of the substrate material.

2. A flexible and deformable label on a deformable container substrate comprising a printable polyethylene film layer, together with an adhesive layer affixed to said deformable substrate, the polyethylene layer derived from medium density polyethylene homopolymer having a specific gravity of from 0.925 to 0.940 g/cc and a tensile strength between 175 kg/cm$^2$ and 246 kg/cm$^2$, and having a thickness between 0.076 mm and 0.0127 mm, wherein the polyethylene film is corona treated to enhance bonding with adhesive, and having printing on a side thereof and a layer of adhesive on a side thereof, said adhesive being selected from the group of materials generally characterized as pressure sensitive and being further characterized by the ability to form a bond with said film such that the strength of the film-adhesive interface and the substrate-adhesive interface and the cohesive strength of the adhesive itself are both greater than the forces required for deformation and recovery of the film itself, and wherein the substrate is selected from the group consisting of polyethylene (high and low density), polyvinyl chloride, polypropylene, polyester, polystyrene, natural rubber, and SBR rubber, said flexible label having improved and surprising characteristics of adhesion to the substrate with resistance to damage from cracking, tearing, creasing, wrinkling or shrinking due to physical abuse and flexing of the substrate material.

3. A flexible and deformable label on a deformable container substrate comprising a printable polyethylene film layer, together with an adhesive layer affixed to said deformable substrate, the polyethylene layer derived from low density polyethylene homopolymer having a specific gravity of 0.925±0.01 g/cc and a tensile strength of 175±35 kg/sq.cm, and having a thickness of 0.0635±0.025 mm, wherein the polyethylene film is corona treated to enhance bonding with adhesive, and having printing on a side thereof and a layer of adhesive on a side thereof, said adhesive being selected from the group of materials generally characterized as pressure sensitive and being further characterized by the ability to form a bond with said film and the substrate such that the strength of the film-adhesive interface and the substrate-adhesive interface and the cohesive strength of the adhesive itself are greater than the force required for deformation and recovery of the film itself, and wherein the substrate is selected from the group consisting of polyethylene (high and low density), polyvinyl chloride, polypropylene, polyester, polystyrene, natural rubber, and SBR rubber, said flexible label having improved and surprising characteristics of adhesion to the substrate with resistance to damage from cracking, tearing, creasing, wrinkling or shrinking due to physical abuse and flexing of the substrate material.

* * * * *

UNITED STATES PATENT AND TRADEMARK OFFICE
CERTIFICATE OF CORRECTION

PATENT NO. : 4,587,158
DATED : May 6, 1986
INVENTOR(S) : William D. Ewing

It is certified that error appears in the above-identified patent and that said Letters Patent is hereby corrected as shown below:

Column 11, line 56 delete, "affixed", and insert --to affix said printable polyethylene film layer--; line 62, before "polyethylene", insert, --surface of the--; same line delete, "corona";

Column 12, line 16, delete "affixed" and insert --to affix said printable polyethylene film layer--; line 22, before "polyethylene" insert --surface of the--; same line delete "corona"; line 24, before "layer", delete "a" and insert --said--; line 43, delete "affixed" and insert --to affix said printable polyethylene film layer--;

UNITED STATES PATENT AND TRADEMARK OFFICE
CERTIFICATE OF CORRECTION

PATENT NO. : 4,587,158
DATED : May 6, 1986
INVENTOR(S) : William D. Ewing

It is certified that error appears in the above-identified patent and that said Letters Patent is hereby corrected as shown below:

Column 12, line 48, before "polyethyl-" insert --surface of the --; line 49 delete "corona"; line 50, delete "a", second occurrence, and insert --said--.

Signed and Sealed this

Twenty-ninth Day of July 1986

[SEAL]

Attest:

DONALD J. QUIGG

Attesting Officer

Commissioner of Patents and Trademarks